(12) United States Patent
Yoshida et al.

(10) Patent No.: US 9,496,722 B2
(45) Date of Patent: Nov. 15, 2016

(54) BATTERY SYSTEM INCLUDING BYPASS ELECTRICAL PATH AND HEATER BYPASS ELECTRICAL PATH THAT CONNECTS A PORTION OF BYPASS ELECTRICAL PATH UPSTREAM RELATIVE TO A HEATER TO A PORTION OF BYPASS ELECTRICAL PATH DOWNSTREAM RELATIVE TO THE HEATER

(75) Inventors: Hiroaki Yoshida, Kyoto (JP); Hiroshi Kawamura, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 766 days.

(21) Appl. No.: 13/388,601

(22) PCT Filed: Aug. 4, 2010

(86) PCT No.: PCT/JP2010/063213
§ 371 (c)(1),
(2), (4) Date: Feb. 2, 2012

(87) PCT Pub. No.: WO2011/016497
PCT Pub. Date: Feb. 10, 2011

(65) Prior Publication Data
US 2012/0133329 A1    May 31, 2012

(30) Foreign Application Priority Data
Aug. 5, 2009   (JP) ................................. 2009-182655

(51) Int. Cl.
H02J 7/00      (2006.01)
H01M 10/625    (2014.01)
(Continued)

(52) U.S. Cl.
CPC .......... *H02J 7/0016* (2013.01); *H01M 10/441* (2013.01); *H01M 10/615* (2015.04); *H01M 10/625* (2015.04); *H01M 10/6571* (2015.04); *H02J 7/0026* (2013.01); *H01M 10/443* (2013.01)

(58) Field of Classification Search
CPC .. H02J 7/0016; H02J 7/0026; H01M 10/443; H01M 10/5006

USPC ......................................... 320/122, 150–154
See application file for complete search history.

(56) References Cited

U.S. PATENT DOCUMENTS 5,675,233 A * 10/1997 Kaneko et al. ............... 320/122
5,825,155 A    10/1998 Ito et al.
(Continued)

FOREIGN PATENT DOCUMENTS

CN     1289155 A       3/2001
DE     600 13 222 T2   1/2005
(Continued)

OTHER PUBLICATIONS

European Search Report dated Apr. 4, 2014.
(Continued)

*Primary Examiner* — Yalkew Fantu
*Assistant Examiner* — Manuel Hernandez
(74) *Attorney, Agent, or Firm* — McGinn IP Law Group, PLLC

(57) ABSTRACT

A battery system is provided that can prevent overcharging during charging, and that can demonstrate appropriate charging performance and output performance of a secondary battery even when the battery system is used in a low-temperature environment. The battery system includes a secondary battery and a protection circuit. The protection circuit includes a bypass electrical path that connects an upstream-side main electrical path that is connected to a positive terminal of the secondary battery to a downstream-side main electrical path that is connected to a negative terminal of the secondary battery. The battery system is configured so that, when the voltage of the secondary battery exceeds a predetermined voltage during charging, current flowing through the secondary battery decreases while current flowing through the bypass electrical path increases, and when the voltage of the secondary battery falls below the predetermined voltage during charging, the current flowing through the secondary battery increases while the current flowing through the bypass electrical path decreases. The bypass electrical path includes a heater that generates heat using the current flowing through the bypass electrical path, and the heater is arranged adjacent to or in close contact with the secondary battery so as to impart a thermal effect to the secondary battery.

14 Claims, 5 Drawing Sheets

(51) Int. Cl.
*H01M 10/615* (2014.01)
*H01M 10/6571* (2014.01)
*H01M 10/44* (2006.01)

(56) References Cited

U.S. PATENT DOCUMENTS

| | | |
|---|---|---|
| 5,903,131 A | 5/1999 | Sekine et al. |
| 6,060,864 A | 5/2000 | Ito et al. |
| 6,064,179 A | 5/2000 | Ito et al. |
| 6,246,217 B1 | 6/2001 | Yoshida et al. |
| 7,521,150 B2 | 4/2009 | Seo et al. |
| 2003/0052647 A1 | 3/2003 | Yoshida et al. |
| 2003/0162084 A1 | 8/2003 | Shigeta et al. |
| 2010/0237829 A1 | 9/2010 | Tatebayashi et al. |

FOREIGN PATENT DOCUMENTS

| | | |
|---|---|---|
| EP | 0 545 747 A1 | 6/1993 |
| EP | 1 091 439 A3 | 3/2002 |
| JP | 07-087673 A | 3/1995 |
| JP | H 11-501447 A | 2/1999 |
| JP | 11-283678 A | 10/1999 |
| JP | 2001-155783 A | 6/2001 |
| JP | 2002-291106 A | 10/2002 |
| JP | 2003-223938 A | 8/2003 |
| JP | 2003-229110 A | 8/2003 |
| JP | 2004-336832 A | 11/2004 |
| JP | 2008-010295 A | 1/2008 |
| WO | WO 96/17397 A1 | 6/1996 |

OTHER PUBLICATIONS

International Search Report in PCT/JP2010/063213 dated Oct. 5, 2010 (English Translation Thereof).
United States Office Action dated Oct. 22, 2014 in U.S. Appl. No. 13/980,557.

* cited by examiner

BATTERY SYSTEM INCLUDING BYPASS ELECTRICAL PATH AND HEATER BYPASS ELECTRICAL PATH THAT CONNECTS A PORTION OF BYPASS ELECTRICAL PATH UPSTREAM RELATIVE TO A HEATER TO A PORTION OF BYPASS ELECTRICAL PATH DOWNSTREAM RELATIVE TO THE HEATER

FIELD OF THE INVENTION

The present invention relates to a battery system that includes a secondary battery and a protection circuit provided with a bypass electrical path, and more particularly to a battery system that is used in a low-temperature environment.

RELATED ART

Hitherto, rechargeable batteries that are named secondary batteries have been in extensive use as power sources that are mounted in various apparatuses and devices, and secondary batteries are also used as a power source to be mounted in aircraft such as small airplanes and helicopters for emergency (back-up) use and for engine starting.

Various kinds of batteries such as a Ni—Cd battery and a lithium-ion secondary battery are available as such secondary batteries, and from the viewpoint of mass reduction and maintenance, the adoption of a lithium-ion secondary battery as a power source for aircraft has been considered.

A secondary battery is charged with electric power that is generated using a power generator or supplied from a battery charger. If the voltage of the supplied electric power is not stable, there is a concern that electric power exceeding a charge upper limit voltage of the secondary battery may be supplied to charge the secondary battery, which could lead to overcharging.

In particular, since a movable body such as an aircraft is configured to drive a power generator with an engine and charge a secondary battery with electric power that is generated by the power generator, the power output of the power generator tends to depend on the output state of the engine (for example, the number of output revolutions), which causes a fluctuation of the voltage of generated electric power and increases the possibility of overcharging of the secondary battery.

When overcharging of a secondary battery occurs as described, if the secondary battery is a Ni—Cd battery, decomposition of the electrolytic solution may proceed and gas may be generated, while if the secondary battery is a lithium-ion secondary battery, flammable gas may be generated by a decomposition reaction of an electrolytic solution or the like, which could result in occurrence of ignition or the like.

In view of this, when a secondary battery is employed as a power source, a protection circuit is provided to prevent overcharging. In particular, when a lithium-ion secondary battery is used, it is essential to provide a protection circuit to prevent overcharging because there is a possibility of ignition or the like when overcharging occurs.

There are a variety of forms of such protection circuits, and examples thereof include a protection circuit that has a bypass electrical path that is coupled to an upstream-side main electrical path that is connected to a positive terminal of a secondary battery, and coupled to a downstream-side main electrical path that is connected to a negative terminal of the battery. Such a protection circuit is configured so that, when the voltage of the secondary battery reaches a predetermined voltage (charge upper limit voltage) during charging, current is diverted from the upstream-side main electrical path to the downstream-side main electrical path via the bypass electrical path. With this, the protection circuit having the aforementioned configuration can prevent overcharging of a secondary battery (cf., for example, Patent Document 1).

PRIOR ART DOCUMENT

Patent Document
Patent Literature 1: Japanese Patent Laid-Open No. 7-087673

DISCLOSURE OF THE INVENTION

Problems to be Solved by the Invention

The internal resistance of a secondary battery increases in a low-temperature environment compared to in a normal temperature environment, and therefore, in a low-temperature environment, voltage variation increases when current is flowed, and the battery reaches a charge upper limit voltage or a discharge lower limit voltage earlier than in a normal temperature environment. Consequently, in a low-temperature environment, secondary batteries cannot be sufficiently charged and cannot supply electric power with a sufficient output, which results in lowering of the charging performance and output performance. There is thus a problem in that when a battery system including a secondary battery is employed as a power source for emergency use and for engine starting of a movable body such as an aircraft that operates in a low-temperature environment, the battery cannot be charged with sufficient electric power that is required for engine starting, and cannot provide power output that is required in an emergency.

Further, for the usage of a secondary battery as a power source of a movable body or an apparatus, there are many cases in which a battery system in which a plurality of secondary batteries are connected in series is often used. However, in a battery system in which a plurality of secondary batteries are connected in series, there are great variations in internal resistance between the respective secondary batteries in a low-temperature environment. Thus, if current is flowed to the respective secondary batteries at the same current value, voltage variations increase during charging, i.e., variations in the state of charge of the secondary batteries increase. There is thus a problem in that it is time-consuming to reduce such variations in the state of charge and enhance the state of charge of the battery system.

An object of the present invention is to provide a battery system that can prevent overcharging of a secondary battery and appropriately provide the charging performance and output performance of a secondary battery even when used in a low-temperature environment.

Means for Solving Problems

According to a first invention of the present application, there is provided a battery system including a secondary battery and a protection circuit, wherein the protection circuit includes a bypass electrical path that connects an upstream-side main electrical path that is connected to a positive terminal of the secondary battery, to a downstream-side main electrical path that is connected to a negative terminal of the secondary battery; the battery system is configured so that, when a voltage of the secondary battery exceeds a predetermined voltage during charging, current flowing through the secondary battery decreases while current flowing through the bypass electrical path increases, and when the voltage of the secondary battery falls below the predetermined voltage during charging, the current flowing through the secondary battery increases while the current flowing through the bypass electrical path decreases; the bypass electrical path includes a heater that generates heat using the current flowing through the bypass electrical path; and the heater is arranged adjacent to or in close contact with the secondary battery so as to impart a thermal effect to the secondary battery. As used herein, the term "upstream" refers to an upper part that is close to an electric power supply source such as a battery charger based on the direction in which the current flows through the electrical path, and the term "downstream" refers to a lower part that is further away from an electric power supply source such as a battery charger than the "upstream" part based on the direction in which the current flows through the electrical path. As used herein, the term "during charging" refers to a state in which current is flowing to the battery system from a battery charger or the like. As used herein, the phrase "current flowing through the secondary battery decreases while current flowing through the bypass electrical path increases" includes a state in which all of the current flows through the bypass electrical path. Furthermore, in this case, the phrase "the current flowing through the secondary battery increases while the current flowing through the bypass electrical path decreases" includes a state in which all of the current flows through the secondary battery.

The above described system is configured such that; in the case in which the predetermined voltage is set to be at a charge upper limit voltage of the secondary battery, when the voltage of the secondary battery exceeds the predetermined voltage during charging, current flowing through the secondary battery decreases while current flowing through the bypass electrical path increases, and when the voltage of the secondary battery falls below the predetermined voltage during charging, the current flowing through the secondary battery increases while the current flowing through the bypass electrical path decreases. With this configuration, overcharging of the secondary battery can be prevented.

Further, the bypass electrical path includes a heater that generates heat using the current flowing through the bypass electrical path, and the heater is arranged adjacent to or in close contact with the secondary battery so as to impart a thermal effect to the secondary battery. Thus, the heater is allowed to generate heat using the current that has been diverted to the bypass electrical path, thereby enabling appropriate charging of the secondary battery even in a low-temperature environment. More specifically, the internal resistance of the secondary battery is greater in a low-temperature environment than in a normal temperature environment, and therefore the voltage of the secondary battery reaches the predetermined voltage (for example, charge upper limit voltage) earlier than when charged under normal temperature. Thus, the charged quantity of electricity is less than the charged quantity under normal temperature. In a battery system that includes an ordinary bypass electrical path (bypass electrical path without a heater), even if current is additionally fed to a secondary battery when the voltage of the secondary battery has reached the charge upper limit voltage, the current does not flow in the direction of the secondary battery, and thus it is impossible to increase the charged quantity of electricity of the secondary battery. However, according to the configuration of the present invention, after the battery voltage has reached the charge upper limit voltage, the secondary battery is heated by the heater that is heated using the current flowing through the bypass electrical path. Thus, the secondary battery has an elevated temperature so that the internal resistance is reduced and the voltage of the secondary battery falls. When the voltage of the secondary battery falls below the charge upper limit voltage, the current flows to the secondary battery, allowing the secondary battery to be charged. Thus, even in a low-temperature environment, repeated switching between heating and charging of the secondary battery allows the secondary battery to be placed in a state that is the same or substantially the same as a fully charged state under normal temperature.

Further, after the secondary battery reaches the fully charged state, the supply of electric power from the battery charger is continued, so that the current flows through the heater to thereby allow the secondary battery to be heated. That is, the continuous supply of electric power to the battery system allows the secondary battery to be heated and the internal resistance of the secondary battery to be reduced, and hence a sufficient output can be supplied even in an emergency in a low-temperature environment.

Thus, the battery system having the above described configuration can achieve the excellent effects of; preventing overcharging by a battery charger; and demonstrating appropriate charging performance and output performance of a secondary battery by heating the secondary battery utilizing surplus electric power during charging.

According to a second invention of the present application, there is provided a battery system in which a plurality of parallel circuits, each having a secondary battery and a protection circuit connected in parallel, are serially connected, wherein the protection circuit of each of the parallel circuits includes a bypass electrical path that connects an upstream-side main electrical path that is connected to a positive terminal of the secondary battery to which the protection circuit is parallelly connected, to a downstream-side main electrical path that is connected to a negative terminal of the secondary battery; the battery system is configured so that, when a voltage of the secondary battery in each of the parallel circuits exceeds a predetermined voltage during charging, current flowing through the secondary battery decreases while current flowing through the bypass electrical path that is parallelly connected to the secondary battery increases, and when the voltage of the secondary battery in each of the parallel circuits falls below the predetermined voltage during charging, the current flowing through the secondary battery increases while the current flowing through the bypass electrical path that is parallelly connected to the secondary battery decreases; the bypass electrical path in each of the parallel circuits includes a heater that generates heat using the current flowing through the bypass electrical path; and the heater is arranged adjacent to or in close contact with the secondary battery in each of the parallel circuits so as to impart a thermal effect to the secondary battery. As used herein, the term "upstream" refers to an upper part that is close to an electric power supply source such as a battery charger based on the direction in which the current flows on the electrical path, and the term "downstream" refers to a lower part that is further away from an electric power supply source such as a battery charger than the "upstream" part based on the direction in which the current flows on the electrical path. As used herein, the term "during charging" refers to a state in which current is flowing to the battery system from a battery charger or the like. As used herein, the phrase "current flowing through the secondary battery decreases while current flowing through the bypass electrical path increases" includes a state in which all of the current flows through the bypass electrical path. As used herein, the phrase "the current flowing through the secondary battery increases and the current flowing through the bypass electrical path decreases" includes a state in which all of the current flows through the secondary battery. Further, in a battery system in which three or more secondary batteries are serially connected, it is sufficient that at least two secondary batteries each include a parallel circuit having the above described configuration.

According to the above described configuration, the battery system in which a plurality of secondary batteries are serially connected has the advantages of preventing overcharging and demonstrating the charging performance and output performance of the respective secondary batteries, and in addition to these, it has the advantage of being capable of enhancing the charging performance of the secondary batteries in a short time period.

In a battery system in which a plurality of secondary batteries are serially connected, variations in internal resistance increase between the respective secondary batteries in a low-temperature environment, and when current flows to the respective secondary batteries at the same current value, a secondary battery that has a large internal resistance reaches a predetermined voltage (for example, a charge upper limit voltage) earlier than a secondary battery that has a small internal resistance. In a battery system including a plurality of secondary batteries, in which switching between charging and heating is performed en bloc for all of the secondary batteries, a heater is heated in accordance with a secondary battery that has a large internal resistance. Because of this, secondary batteries that have a small internal resistance are not charged while the heater is being heated. In contrast, according to the above described configuration, the switching between charging and heating is performed for the respective secondary batteries on an individual basis, and therefore charging can be performed efficiently in accordance with the internal resistance of each secondary battery, so that the state of charge of the secondary batteries can be increased in a shorter time than in a battery system in which the switching between charging and heating is performed en bloc. As a result, electric power with a sufficient output can be supplied even in a situation in which output, is required in an emergency during the course of charging the battery system.

Further, in a battery system in which a plurality of secondary batteries are connected, temperature variations occur between the secondary batteries due to differences in their arrangements of the secondary batteries. If these secondary batteries are heated en bloc with a heater, there is a concern that even a secondary battery that is at an appropriate temperature may be heated, resulting in a shortened life due to excessive heating. In contrast, in the above described configuration, a heater is provided for each bypass electrical path that is provided for each secondary battery, and therefore optimal heating can be performed according to the temperature of each secondary battery, and shortening of the life of the secondary batteries can be prevented.

According to a third invention of the present application, there is provided a battery system that includes a secondary battery, and a bypass electrical path that connects an upstream-side main electrical path that is connected to a positive terminal of the secondary battery to a downstream-side main electrical path that is connected to a negative terminal of the secondary battery, wherein the battery system is configured so that, when a temperature of the secondary battery is lower than a predetermined temperature in a state in which charging is not being performed, a closed circuit is formed by the secondary battery, a portion of the upstream-side main electrical path of the secondary battery downstream relative to a connection position with the bypass electrical path, a portion of the downstream-side main electrical path of the secondary battery upstream relative to a connection position with the bypass electrical path, and the bypass electrical path; the bypass electrical path includes a heater that generates heat using current flowing through the bypass electrical path; and the heater is arranged adjacent to or in close contact with the secondary battery so as to impart a thermal effect to the secondary battery. As used herein, the term "predetermined temperature" refers to a temperature at which the charging performance and output performance of the secondary battery are standard. As used herein, the term "a state in which charging is not being performed" refers to a state in which current is not flowing from a battery charger or the like to the battery system.

When a closed circuit is formed in this manner by the secondary battery, the portion of the upstream-side main electrical path downstream relative to the connection position with the bypass electrical path, the portion of the downstream-side main electrical path upstream relative to the connection position with the bypass electrical path, and the bypass electrical path, the heater is allowed to generate heat using the electric power of the secondary battery. Therefore, the secondary battery is heated by a heater that generates heat using the electric power of the secondary battery itself, so as to have appropriate output performance. It is thus possible to prevent a power shortage that may occur when starting an apparatus (for example, when starting the engine of a small airplane or a helicopter).

In the battery system according to the first or second invention, preferably the protection circuit further includes a heater bypass electrical path that connects a portion of the bypass electrical path upstream relative to the heater to a portion of the bypass electrical path downstream relative to the heater, and when a temperature of the secondary battery exceeds a predetermined temperature, the current flows to the heater bypass electrical path. With this configuration, the current does not flow to the heater when the temperature of the secondary battery exceeds a predetermined temperature, and it is therefore possible to prevent the heater from heating the secondary battery more than necessary.

In the above described configuration, the protection circuit preferably includes a resistor disposed at a midway position of the heater bypass electrical path; a heat radiator that radiates heat of the resistor of the heater bypass electrical path to outside; and an electrical path changeover switch disposed at least one of the connection positions at which the bypass electrical path and the heater bypass electrical path are connected to each other, the electrical path changeover switch provided to connect the portion of the bypass electrical path upstream relative to the connection position and the portion of the bypass electrical path downstream relative to the connection position until the temperature of the secondary battery reaches a predetermined temperature, and to connect the portion of the bypass electrical path upstream relative to the connection position to the heater bypass electrical path when the temperature of the secondary battery exceeds the predetermined temperature.

With this configuration, it is possible to switch between a state in which current flows towards the heater and a state in which current flows towards the resistor on the heater bypass electrical path by turning on and off the electrical path changeover switch. When the system is in the state in which the current flowing through the bypass electrical path flows towards the heater, it is possible to provide appropriate output performance and charging performance by heating the secondary battery with the heater. On the other hand, when the system is in the state in which the current flows in the heater bypass electrical path, the resistor arranged in the heater bypass electrical path generates heat, but the heat is released to outside by the heat radiator. While the resistor generates heat and the heat radiator releases the heat to outside as mentioned, the heater does not heat the secondary battery, and it is therefore possible to prevent excessive heating of the secondary battery.

In the battery system of the first and second inventions, the heater preferably has a resistance value that satisfies Expression 1 below. By use of a heater having a resistance value that satisfies Expression 1 below, the resistance value of the heater is less than the resistance of the secondary battery in a fully charged state, which facilitates the flow of a charging current toward the bypass electrical path and thus can prevent overcharging of the secondary battery.

> The resistance value of the heater<set charging voltage of the secondary battery/maximum charging current flowing through the secondary battery (Expression 1)

For the heater to satisfy the above Expression, aluminum, copper, or an alloy containing these metals may be preferably used as principal components for a conductor of the heater. For a conductor of typical heaters, carbon or nichrome or the like is used. However, in order to reduce the resistance of a heater that includes carbon or nichrome, it is necessary that the conductor have a large cross section, which results in increased dimensions and mass of the heater. In contrast, in a heater having a conductor made of aluminum, copper, or an alloy containing these metals as principal components, the cross section of the conductor can be small while the resistance of the heater is reduced. Thus, a battery system that is small and lightweight can be provided.

Preferably, the battery system according to the third invention further includes a heater bypass electrical path that connects a portion of the bypass electrical path upstream relative to the heater to a portion of the bypass electrical path downstream relative to the heater, wherein when the temperature of the secondary battery exceeds a predetermined temperature, the current flows to the heater bypass electrical path. With this, current does not flow to the heater when the temperature of the secondary battery is higher than a predetermined temperature, and therefore it is possible to prevent the heater from heating the secondary battery more than necessary.

In the above described configuration, the battery system may preferably include: a resistor disposed at a midway position of the heater bypass electrical path; a heat radiator that radiates heat of the resistor of the heater bypass electrical path to outside; and an electrical path changeover switch disposed at least one of the connection position with the bypass electrical path and the connection position with the heater bypass electrical path, the electrical path changeover switch provided to connect the portion of the bypass electrical path upstream relative to the connection position to the portion of the bypass electrical path downstream relative to the connection position until the temperature of the secondary battery reaches a predetermined temperature, and to connect the portion of the bypass electrical path upstream relative to the connection position to the heater bypass electrical path when the temperature of the secondary battery exceeds higher than the predetermined temperature.

With this configuration, it is possible to switch between a state in which current flows towards the heater and a state in which current flows towards the resistor on the heater bypass electrical path by turning on and off the electrical path changeover switch. When the system is in the state in which the current flowing through the bypass electrical path flows towards the heater, it is possible to provide appropriate output performance and charging performance by heating the secondary battery with the heater. On the other hand, when the system is in the state in which the current flows in the heater bypass electrical path, the resistor provided in the heater bypass electrical path generates heat, but the heat is released to outside by the heat radiator. While the resistor generates heat and the heat radiator releases the heat to outside as mentioned, the heater does not heat the secondary battery, and it is therefore possible to prevent excessive heating of the secondary battery.

In the battery system of the third invention, preferably a switch, which makes the closed circuit an open circuit when the temperature of the secondary battery exceeds the predetermined temperature is provided on any one of; the portion of the upstream-side main electrical path of the secondary battery downstream relative to the connection position with the bypass electrical path; the portion of the downstream-side main electrical path of the secondary battery upstream relative to the connection position with the bypass electrical path; and the bypass electrical path.

With this configuration, when the temperature of the secondary battery exceeds the predetermined temperature, the current of the secondary battery does not flow to the bypass electrical path, i.e., to the heater, so that the heater does not heat the secondary battery. Thus, possible to prevent excessive heating of the secondary battery.

In the battery system of the third invention, preferably a switch, which forms the closed circuit based on a signal from outside, is provided on any one of: the portion of the upstream-side main electrical path of the secondary battery downstream relative to the connection position with the bypass electrical path; the portion of the downstream-side main electrical path of the secondary battery upstream relative to the connection position with the bypass electrical path; and the bypass electrical path. As used herein, the term "signal from outside" refers to a signal depending on a determination of an operator.

With this configuration, since the bypass electrical path, the secondary battery, the upstream-side main electrical path, and the downstream-side main electrical path do not form a closed circuit until the switch (manual opening-closing switch) enters an on-state in accordance with a signal from outside, it is possible to prevent unnecessary consumption of electric power of the secondary battery (to prevent the battery from going dead).

In the battery system of the third invention, aluminum, copper, or an alloy containing these metals may be preferably used as principal components for a conductor of the heater. For a conductor of typical heaters, carbon or nichrome or the like is used. By the use of these metals for the conductor of the heater, the cross section of the conductor can be small, and thus a battery system that is small and lightweight can be provided.

The secondary battery is preferably a lithium-ion secondary battery. While lithium-ion batteries are liable to have a declined output performance and charging performance in a low-temperature environment as compared with other secondary batteries such as a Ni—Cd battery or the like, the battery system of the present invention can achieve expected performance of lithium-ion batteries (performance under normal temperature) because it includes the bypass electrical path having the above described configuration. In addition, the use of a lithium-ion secondary battery allows the battery system to be lightweight as well as to exhibit excellent maintenance characteristics.

Advantages of the Invention

As described above, according to the battery system of the present invention, it is possible to produce advantageous effects of enabling the prevention of overcharging of a secondary battery, and of allowing the secondary battery to appropriately provide the charging performance and output performance even when it is used in a low-temperature environment.

DETAILED DESCRIPTION OF THE PREFERRED EMBODIMENT

A battery system according to one embodiment of the present invention is described hereinafter with reference to the accompanying drawings.

The battery system is designed for use in various kinds of apparatuses and equipment that include a secondary battery (hereinafter referred to as "battery cell") as a power source. In the present embodiment, the description is directed to a small airplane or helicopter (hereinafter referred to collectively as "aircraft") that includes a battery cell as a power source for emergency use and for engine starting.

Figure 1:
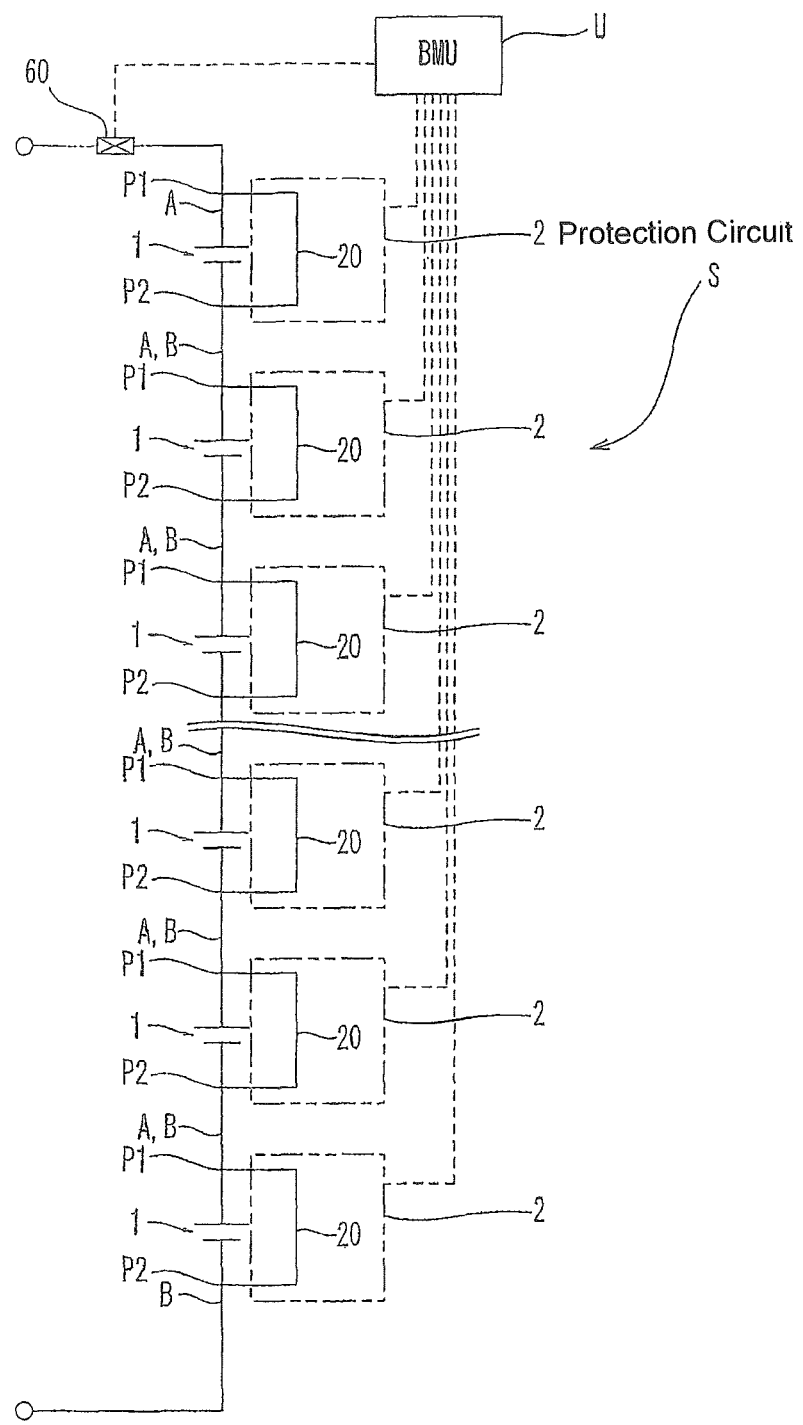
FIG. 1 is a schematic diagram of a power source section in an apparatus (aircraft) that includes a battery system according to one embodiment of the present invention.

As shown in FIG. 1, the battery system according to the present embodiment includes a rechargeable and dischargeable battery cell 1 and a protection circuit 2 that prevents overcharging of the battery cell 1. As a power source for emergency use and a power source for engine starting to be mounted in an aircraft, typically battery systems include a plurality of battery cells that are arranged in series. The battery system S of the present embodiment also includes a plurality of battery cells 1 . . . that are connected in series as a power source for emergency use (for backup) and for engine starting.

In the present embodiment, a lithium-ion secondary battery is adopted as the battery cell 1. In each battery cell 1, an upstream-side main electrical path A is connected to a positive terminal (not shown), and a downstream-side main electrical path B is connected to a negative terminal (not shown). In the present embodiment, the plurality of battery cells 1 . . . are connected in series, and therefore each of the upstream-side main electrical paths A, which is connected to the positive terminal of each battery cell 1, is connected to the negative terminal of the adjacent battery cell 1 on the upstream side in the direction in which the current flows. Consequently, in the present embodiment, the upstream-side main electrical path A that is connected to the positive terminal of each battery cell 1 serves as the downstream-side main electrical path B of the adjacent battery cell 1 on the upstream side.

The most upstream one of the battery cells 1 . . . (battery cell at the most upstream position in the direction in which the current flows) is connected to a battery charger (not shown) through the positive terminal via the upstream-side main electrical path A. The most downstream one of the battery cells 1 . . . (battery cell at the most downstream position in the length direction of the current) is connected to the body (metal portion) of the aircraft through the negative terminal to via the downstream-side main electrical path B and thereby grounded.

Thus, current flows from the battery charger to each of the plurality of battery cells 1 . . . through the upstream-side main electrical path A and the downstream-side main electrical path B, so as to charge the respective battery cells 1. The present embodiment is directed to a power source (battery cell 1) for emergency and for engine starting of an aircraft, and therefore it is noted that charging of each battery cell 1 is performed while the aircraft is flying.

A battery management unit (BMU) U, which manages execution of charging with respect to each battery cell 1, is mounted in the aircraft. The battery management unit U is configured to be capable of detecting at least temperature of each battery cell 1. The battery management unit U of the present embodiment is configured to be also capable of detecting temperature, current values, voltage values and the like of the battery cells 1 by means of a detector (not shown) that is attached to the battery cells 1. The battery management unit U is also configured to transmit an instruction signal to give instructions, based on detection results, on the start and stopping of charging by the battery charger as well as on turning on and off or the like of a switch and an electrical path changeover switch described later.

In the battery system S of the present embodiment, each battery cell 1 includes the protection circuit 2. In the battery system S, each battery cell 1 includes an independent protection circuit 2 connected in parallel thereto. More specifically, the battery system S of the present embodiment includes a plurality of parallel circuits that are connected in series, each of which includes the battery cell 1 and the protection circuit 2 that are connected in parallel. Each protection circuit 2 includes a bypass electrical path 20 that connects the upstream-side main electrical path A that is connected to the positive terminal of the battery cell 1 to the downstream-side main electrical path B that is connected to the negative terminal of the relevant battery cell 1. More specifically, the protection circuit 2 includes the bypass electrical path 20 that links a connection position P1 that is located on the upstream-side main electrical path A (hereinafter referred to as "first connection position") and a connection position P2 that is located on the downstream-side main electrical path B (hereinafter referred to as "second connection position").

The respective protection circuits 2 are configured so that, when the voltage of the battery cell 1 exceeds a predetermined voltage during charging, the current flows from the upstream-side main electrical path A to the downstream-side main electrical path B via the bypass electrical path 20, and when the voltage of the relevant battery cell 1 falls below a predetermined voltage, the current flows from the upstream-side main electrical path A towards the battery cell 1.

Figure 2:
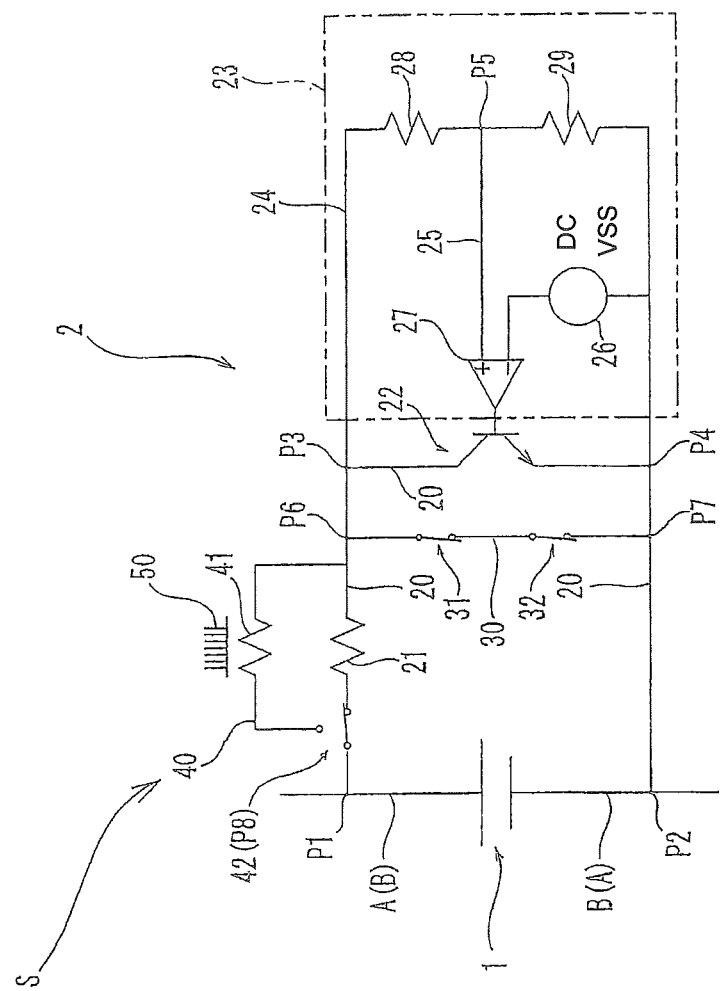
FIG. 2 is a schematic circuit diagram of the battery system according to the embodiment.

As shown in FIG. 2, the bypass electrical path 20 of each protection circuit 2 includes a heater 21 that generates heat using the current that flows through the bypass electrical path 20. The heater 21 is arranged in the battery cell 1 in a state in which a layer of a heat conducting material is interposed between the heater 21 and the battery cell 1. Further, a conductor made of aluminum is used for the heater 1 and the dimension (cross-sectional area, and length) of the conductor is adjusted so that a resistance value of the heater 21 is less than a value obtained by dividing the set charging voltage of the battery cell 1 by the maximum value of charging current that flows through the battery cell 1. More specifically, the heater 21 is formed so that the resistance value satisfies Expression 1: Resistance value of heater 21<set charging voltage of battery cell (secondary battery) 1/maximum charging current that flows through battery cell (secondary battery) 1.

The bypass electrical path 20 includes a switch 22 that opens the bypass electrical path 20 when the voltage of the battery cell 1 falls below a predetermined voltage and that closes the bypass electrical path 20 when the voltage of the battery cell 1 exceeds the predetermined voltage. In the present embodiment, the switch 22 is constituted by a transistor. In association with this, the protection circuit 2 of the present embodiment includes a switch driving circuit 23 for opening and closing the bypass electrical path 20 by means of the switch (transistor) 22. In the present embodiment, the term "predetermined voltage" refers to a charge upper limit voltage of the battery cell 1, which typically means a battery voltage according to the design specifications of the battery cell 1.

The switch driving circuit 23 is now described. The switch driving circuit 23 of the present embodiment includes: a main electrical path for driving 24 that links a connection position P3 that is located between the heater 21 and the transistor (switch device) 22 in the bypass electrical path 20 (hereinafter referred to as "third connection position) and a connection position P4 that is located between the transistor (switch device) 22 and the second connection position P2 (hereinafter referred to as "fourth connection position"); a branch electrical path 25 that is branched from a midway position P5 of the main electrical path for driving 24; a direct-current voltage supply source 26 that supplies a reference voltage; and a comparator 27 that compares a voltage of the branch electrical path 25 with a reference voltage of the direct-current voltage supply source 26.

The main electrical path for driving 24 includes: a first resistor 28 disposed between the third connection position P3 and the branching position P5 of the branch electrical path 25; and a second resistor 29 disposed between the fourth connection position P4 and the branching position P5. With this, the main electrical path for driving 24 is configured so that, the voltage of the battery cell 1 is divided into an upstream side and a downstream side based on the branching position P5, and a voltage that corresponds to the reference voltage is applied to the branch electrical path 25. The direct-current voltage supply source 26 is provided to supply a voltage that serves as a reference for determination on whether or not the voltage of the battery cell 1 is a reference value (reference voltage), and is constituted, for example, by a zener diode or a constant voltage circuit.

The comparator 27 compares the voltage of the branch electrical path 25 with the reference voltage of the direct-current voltage supply source 26. When the voltage of the branch electrical path 25 is higher than the reference voltage, the comparator 27 instructs the switch 22 to close the bypass electrical path 20, and when the voltage of the branch electrical path 25 is lower than the reference voltage, the comparator 27 instructs the switch 22 to open the bypass electrical path 20. In the present embodiment, a transistor is adopted as the switch 22 that is provided for the bypass electrical path 20, and therefore, when the voltage of the branch electrical path 25 is higher than the reference voltage, the comparator 27 feeds a base current to the transistor 22 as an instruction signal to cause the transistor (switch) 22 to close the bypass electrical path 20, and when the voltage of the branch electrical path 25 is lower than the reference voltage, the comparator 27 stops the supply of the base current to the transistor to cause the transistor (switch) 22 to open the bypass electrical path 20.

The protection circuit 2 of the present embodiment is configured so that, when the temperature of the battery cell 1 is lower than a predetermined temperature in a state in which charging is not being performed for the battery cell 1, a closed circuit is formed by the battery cell 1, a portion of the upstream-side main electrical path A downstream relative to the connection position (first connection position) P1 with the bypass electrical path 20, a portion of the downstream-side main electrical path B upstream relative to the connection position (second connection position) P2 with the bypass electrical path 20, and the bypass electrical path 20. It is to be noted that the term "predetermined temperature" refers to a temperature that provides an environment in which the maximum battery performance (output performance and charging performance) of the battery cell 1 can be obtained, while referring in general to a temperature at which battery performance according to the design specifications of the battery cell 1 can be obtained.

A description is now given of the specific configuration that allows a closed circuit to be formed by the battery cell 1, the portion of the upstream-side main electrical path A downstream relative to the first connection position P1, the portion of the downstream-side main electrical path B upstream relative to the second connection position P2, and the bypass electrical path 20. The protection circuit 2 of the present embodiment includes a short-cut electrical path 30 that links a first position P6 that is located on a position of the bypass electrical path 20 downstream relative to the heater 21 and a second position P7 that is located on a position of the bypass electrical path 20 downstream relative to the first position P6. In association with this, in the protection circuit 2 of the present embodiment, the switch 22 of the bypass electrical path 20 is arranged between the first position P6 and the second position P7.

The short-cut electrical path 30 has an electrical path opening-closing switch 31, which opens the short-cut electrical path 30 when the temperature of the battery cell 1 is higher than the predetermined temperature, and closes the short-cut electrical path 30 when the temperature of the battery cell 1 is lower than the predetermined temperature.

In the present embodiment, the battery management unit U is mounted in the aircraft as described above, and therefore the electrical path opening-closing switch 31 on the short-cut electrical path 30, based on an instruction signal that is sent from the battery management unit U, opens the short-cut electrical path 30 when the temperature of the battery cell 1 is higher than the predetermined temperature, and closes the short-cut electrical path 30 when the temperature of the battery cell 1 is lower than the predetermined temperature. More specifically, the electrical path opening-closing switch 31 is configured to turn on (close the short-cut electrical path 30) when the temperature of the battery cell 1 is −10° C. or less, more preferably −20° C. or less, and turn off (open the short-cut electrical path 30) when the temperature of the battery cell 1 is 0° C.

The short-cut electrical path 30 of the present embodiment a manual opening-closing switch 32, which manually switches between the open and close (disconnecting and connecting) states of the short-cut electrical path 30.

The protection circuit 2 of the present embodiment further includes a heater bypass electrical path 40 that connects a portion of the bypass electrical path 20 upstream relative to the heater 21 and a portion of the bypass electrical path 20 downstream relative to the heater 21. Thus, the protection circuit 2 according to the present embodiment is configured so that the current flows to the heater bypass electrical path 40 if the temperature of the battery cell 1 exceeds a predetermined temperature as a result of heating by the heater 21.

The protection circuit 2 of the present embodiment has a resistor 41 disposed at a midway position of the heater bypass electrical path 40, and in association with this, a heat radiator 50 is provided which radiates heat of the resistor 41 of the heater bypass electrical path 40 to outside.

Further, the protection circuit 2 of the present embodiment has an electrical path changeover switch 42 that is located at a connection position P8 that is at least one of the connection positions between the bypass electrical path 20 and the heater bypass electrical path 40 (according to the present embodiment, a connection position on the upstream side; hereinafter referred to as "fifth connection position"). The electrical path changeover switch 42 is provided to connect the portion of the bypass electrical path 20 upstream relative to the fifth connection position P8 to the portion of the bypass electrical path 20 downstream relative to the fifth connection position P8 until the temperature of the battery cell 1 reaches a predetermined temperature, and to connect the portion of the bypass electrical path 20 upstream relative to the fifth connection position P8 to the heater bypass electrical path 40 when the temperature of the battery cell 1 exceeds the predetermined temperature.

In the present embodiment, the battery management unit U is mounted in the aircraft as described above, the electrical path changeover switch 42, based on an instruction signal that is sent from the battery management unit U, connects the portion of the bypass electrical path 20 upstream relative to the fifth connection position P8 to the portion of the bypass electrical path 20 downstream relative to the fifth connection position P8 until the temperature of the battery cell 1 reaches a predetermined temperature, and connects the portion of the bypass electrical path 20 upstream relative to the fifth connection position P8 to the heater bypass electrical path 40 when the temperature of the battery cell 1 exceeds the predetermined temperature. The electrical path changeover switch 42 may be configured so as to close the heater bypass electrical path 40 when the temperature of the battery cell 1 reaches 35° C. while closing the bypass electrical path 20 (the heater 21 side) when the temperature of the battery cell 1 reaches 0° C. In consideration of the performance of the battery cell 1, however, it is preferable that the electrical path changeover switch 42 be configured so as to close the heater bypass electrical path 40 when the temperature of the battery cell 1 reaches 25° C. and close the bypass electrical path 20 (the heater 21 side) when the temperature of the battery cell 1 reaches 10° C.

Further, as shown in FIG. 1, the upstream-side main electrical path A includes a circuit breaker 60 that opens the upstream-side main electrical path A when at least any one of the following cases: when a current that is greater than or equal to a prescribed level flows, when a voltage that is greater than or equal to a prescribed level is applied, and when the temperature of the battery cell 1 reaches or exceeds a prescribed level. The aforementioned prescribed level of voltage is set to be higher than the predetermined voltage at which current flows to the bypass electrical path 20, and the aforementioned prescribed level of temperature is set to be higher than the predetermined temperature at which current flows to the heater bypass electrical path 40.

In the present embodiment, a plurality of battery cells 1 . . . are arranged in series as described above, and the circuit breaker 60 is provided only for the one of the upstream-side main electrical paths A connected to the most upstream one of the battery cells 1 that is disposed at the most upstream position. The circuit breaker 60 opens the upstream-side main electrical path A based on an instruction from the battery management unit U when it determines that the current value of a battery cell 1 (at least one of the battery cells 1) is greater than or equal to a prescribed current value, The protection circuit 2 according to the present embodiment has the above described configuration. With reference to FIG. 1 and FIG. 2, described now is an operation of the protection circuit 2 in association with operations of aircraft from engine starting to flying.

First, before starting the engine of the aircraft, the operator (pilot) turns on the manual opening-closing switch 32, with which the short-cut electrical path 30 has been opened, so as to close the short-cut electrical path 30. In this state, current is not supplied to the battery cell 1 because the engine has not yet been started, and the battery charger (or power generator) is also not driven.

Subsequently, when the battery management unit U determines that the temperature of the battery cell 1 is lower than a predetermined temperature (a temperature that provides an environment in which the charging and discharging performance of the battery cell 1 deteriorates), the battery management unit U sends an instruction signal to the electrical path opening-closing switch 31 to instruct it to close the short-cut electrical path 30, when the battery management unit U determines that the temperature of the battery cell 1 is higher than the predetermined temperature (a temperature that provides an environment in which the charging and discharging performance of the battery cell 1 are appropriate), the battery management unit U sends an instruction signal to the electrical path opening-closing switch 31 to instruct it to open the short-cut electrical path 30.

Thus, when the operator turns on the manual opening-closing switch 32 and the temperature of the battery cell 1 is higher than the predetermined temperature, the short-cut electrical path 30 is placed in an open state by the electrical path opening-closing switch 31. Thus, the battery cell 1, the upstream-side main electrical path A, the downstream-side main electrical path B, part of the bypass electrical path 20, and the short-cut electrical path 30 are held in an open state, so that the battery cell 1 is not heated by the heater 21 on the bypass electrical path 20. In the meantime, since the temperature of the battery cell 1 is higher than the predetermined temperature, the output performance thereof is in an appropriate state.

On the other hand, when the operator (pilot) turns on the manual opening-closing switch 32, if the temperature of the battery cell 1 is lower than the predetermined temperature, the electrical path opening-closing switch 31 closes the short-cut electrical path 30, and thus the battery cell 1, the upstream-side main electrical path A, the downstream-side main electrical path B, part of the bypass electrical path 20, and the short-cut electrical path 30 are placed in a closed state. Then, the battery cell 1 causes the heater 21 to generate heat using the electric power of the battery cell 1 itself, and is heated to a predetermined temperature (or, a temperature that is higher than the predetermined temperature) by the heat.

This allows the battery cell 1 to be in a state in which it demonstrates appropriate output performance, and therefore the operator (pilot) starts the engine, the battery cell 1 can supply a necessary and sufficient amount of electric power for the starting operation.

After the engine has been started (during flight), charging of the battery cell 1 is performed. More specifically, the battery management unit U instructs the battery charger to charge (feed current to) the battery cell 1 while the aircraft is flying. Further, in the present embodiment, the short-cut electrical path 30 is provided in the protection circuit 2, and therefore the battery management unit U also sends an instruction to turn off the electrical path opening-closing switch 31 of the short-cut electrical path 30 (to open the short-cut electrical path 30) together with the instruction to the battery charger to begin charging. In principle, after the engine is started up, the operator turns off the manual opening-closing switch 32 to open the short-cut electrical path 30. However, even if the operator forgets to turn off the manual opening-closing switch 32, the electrical path opening-closing switch 31 is turned off based on an instruction from the battery management unit U as described above, and therefore the short-cut electrical path 30 is not placed in a conductive state during flight.

The battery cell 1 is heated by the heater 21 before the starting of the engine, and therefore the output performance as well as charging performance of the battery cell 1 is made to be appropriate as described above, so that appropriate charging is achieved. More specifically, in a low-temperature environment in the sky, the battery cell 1 has a large internal resistance and the voltage of the battery cell 1 quickly reaches the predetermined voltage, but in the present embodiment, the battery cell 1 is heated before starting of the engine to have a reduced internal resistance, so that appropriate charging is achieved. Further, in the sky in which aircraft flies, the temperature of the battery cell 1 falls and the voltage of the battery cell 1 quickly reaches the predetermined voltage because of the low-temperature environment. However, current flows to the heater 21 to heat the battery cell 1, and therefore the voltage of the heated battery cell 1 falls, so that the current flows to the battery cell 1 to charge it. Repeated switching between charging and heating allows the battery cell 1 to be placed in a state of charge that is the same or substantially the same as a fully charged state under normal temperature. Further, the bypass electrical path 20 is provided for each battery cell 1, and therefore the switching between charging and heating can be performed in accordance with the magnitude of the internal resistance of each battery cell 1, which makes it possible to enhance the state of charge of the respective battery cells 1 in a shorter time than in a case in which switching between charging and heating of all the battery cells 1 is performed en bloc.

Specific operations of the protection circuit 2 are now described. If the voltage of the battery cell 1 is lower than the predetermined voltage, the switch (transistor) 22 on the bypass electrical path 20 is in an off-state to open the bypass electrical path 20, so that current does not flow through the bypass electrical path 20. In the main electrical path for driving 24 of the switch driving circuit 23 that is continuous with the bypass electrical path 20, the resistances of the first resistor 28 and the second resistor 29 are large (they are set, for example, to a resistance of the order of MΩ), and therefore only a current of the order of μA flows in the bypass electrical path 20 and the main electrical path for driving 24 (heater 21, first resistor 28, and second resistor 29), for example, and the bypass electrical path 20 and the main electrical path for driving 24 are in a state in which almost no current is flowing therein.

When the voltage of the battery cell 1 exceeds the predetermined voltage in association with charging, the voltage that is applied to the branch electrical path 25 through the bypass electrical path 20 and the main electrical path for driving 24 (voltage that has been divided with the first resistor 28 and the second resistor 29) exceeds an internal reference voltage supplied from the direct-current voltage supply source 26. Then, the comparator 27 actuates the switch 22 (feeds a base current to the transistor 22), so as to close the bypass electrical path 20 that has been opened by the switch 22.

This allows the current from the battery charger to flow to the bypass electrical path 20, thereby preventing the voltage of the battery cell 1 from exceeding the predetermined voltage (preventing the battery cell 1 from becoming overcharged). When current flows to the bypass electrical path 20, the current also flows to the main electrical path for driving 24, but the resistances of the first resistor 28 and the second resistor 29 disposed on the main electrical path for driving 24 are extremely large, and therefore almost all of the current flows through the bypass electrical path 20.

Further, when the battery cell 1 reaches a state of full charge or a state that is substantially the same as the fully charged state as a result of the repeated switching between charging and heating of the battery cell 1 as described above, the voltage of the battery cell 1 does not fall and therefore surplus current from the battery charger flows to the bypass electrical path 20. Even after the battery cell 1 has reached a fully charged state or a state that is substantially the same as the fully charged state, supply of current from the battery charger (or power generator) is continued, and current continues to flow in the bypass electrical path 20, so that the heater 21 on the bypass electrical path 20 generates heat to thereby heat the battery cell 1. That is, even after charging of the battery cell 1 has ended, feeding of the current from the battery charger (or power generator) to the bypass electrical path 20 is continued, thereby allowing the temperature of the battery cell 1 to be higher than the predetermined temperature. Thus, the battery cell 1 is in a state in which it demonstrates appropriate output performance in the sky, which is a low-temperature environment, thereby preventing a power shortage when the battery cell 1 is utilized as a power source for an emergency.

Furthermore, if current continues to flow through the bypass electrical path 20 and the heater 21 continues to generate heat, the battery cell 1 is heated more than necessary. In the present embodiment, however, when the battery management unit U determines that the temperature of the battery cell 1 has exceeded a predetermined temperature (a temperature range in which the charging performance and output performance are in an appropriate state), the battery management unit U sends an instruction signal to the electrical path changeover switch 42, which connects the portion of the bypass electrical path 20 upstream relative to the fifth connection position P8 to the portion of the bypass electrical path 20 downstream relative to the fifth connection position P8, to instruct the electrical path changeover switch 42 to open the downstream portion (the heater 21 side) relative to the fifth connection position P8 to connect to the heater bypass electrical path 40.

With this, the electrical path changeover switch 42 connects the portion of the bypass electrical path 20 upstream relative to the fifth connection position P8 to the heater bypass electrical path 40, allowing the current flow to shift to the heater bypass electrical path 40 (stopping the current from flowing to the heater 21). This causes the resistor 41 on the heater bypass electrical path 40 to generate heat, but the heat is radiated to outside by the heat radiator 50, which results in reducing or preventing the heating of the battery cell 1.

When the battery management unit U determines that the temperature of the battery cell 1 has fallen below the predetermined temperature, the battery management unit U sends an instruction signal to the electrical path changeover switch 42 that closes the heater bypass electrical path 40 at the fifth connection position P8 to instruct it to open the heater bypass electrical path 40 and close the bypass electrical path 20 (the heater 21 side).

With this, the electrical path changeover switch 42 connects a portion of the bypass electrical path 20 upstream relative to the fifth connection position P8 and a portion of the bypass electrical path 20 downstream relative to the fifth connection position P8 (the heater 21 side), shifting the current flow towards the heater 21 (i.e., allowing the heater 21 to generate heat). Then, the heater 21 heats the battery cell 1 to the temperature range in which the charging performance and output performance of the battery cell 1 are in an appropriate state. This prevents excessive heating of the battery cell 1, as well as prevents a power shortage when the battery cell 1 is utilized as a power source for an emergency.

When the voltage of the battery cell 1 falls below the predetermined voltage because of some trouble that requires an emergency use of the battery cell 1 or due to self-discharge, the voltage that is applied to the branch electrical path 25 through the bypass electrical path 20 and the main electrical path for driving 24 (voltage that has been divided with the first resistor 28 and second resistor 29) falls below the internal reference voltage supplied from the direct-current voltage supply source 26. In such a case, the comparator 27 actuates the switch 22 (stops the supply of the base current to the transistor 22), so as to open the bypass electrical path 20 that has been closed by means of the switch 22.

This allows current from the battery charger to flow from the upstream-side main electrical path A to the battery cell 1, thereby charging the battery cell 1. At the time of the charging, even if the aircraft is in a low-temperature environment in the sky, repeated switching between charging and heating of the battery cell 1 allows the battery cell 1 to return to the state that is the same or substantially the same as a fully charged state under normal temperature. Further, the bypass electrical path 20 is provided for each battery cell 1, and therefore the switching between charging and heating can be performed individually for the respective battery cells 1 in accordance with the magnitude of the internal resistance of each battery cell 1, which makes it possible to enhance the state of charge of the battery cells 1 in a short time When the flight ends, the battery management unit U instructs the battery charger to stop the charging of (stop the supply of current to) the battery cell 1, and thus the charging of the battery cell 1 ends. However, because charging of the battery cell 1 has been appropriately performed during flight as described above, electric power that is required for the next engine starting is stored in the battery cell 1.

As described above, the battery system S according to the present embodiment includes the battery cell 1 and the protection circuit 2 for protecting the battery cell 1 from overcharging, in which the protection circuit 2 includes the bypass electrical path 20 that connects the upstream-side main electrical path A that is connected to the positive terminal of the battery cell 1 and the downstream-side main electrical path B that is connected to the negative terminal of the battery cell 1, and which is configured so that when the voltage of the battery cell 1 exceeds a predetermined voltage during charging, current flows from the upstream-side main electrical path A to the downstream-side main electrical path B through the bypass electrical path 20, while when the voltage of the battery cell 1 falls below the predetermined voltage during charging, the current flows from the upstream-side main electrical path A towards the battery cell 1, and hence it is possible to reliably prevent overcharging of the battery cell 1.

Further, in the protection circuit 2 according to the present embodiment, the bypass electrical path 20 includes the heater 21 that generates heat using the current that flows through the bypass electrical path 20, and since the heater 21 is arranged adjacent to or in close contact with the battery cell 1 so as to impart a thermal effect to the battery cell 1, the heater 21 is allowed to generate heat using the current that has been released to the bypass electrical path 20 and the battery cell 1 can be heated. The internal resistance of the battery cell 1 is greater in a low-temperature environment in the upper air than under normal temperature and the voltage of the battery cell 1 quickly reaches the predetermined voltage during charging, and therefore the state of charge cannot be enhanced. However, because of the heater 21 provided for the protection circuit 2 and repeated switching between charging and heating of the battery cell 1, it is possible to place the battery cell 1 in a state of full charge or a state that is substantially the same as the fully charged state even in a low-temperature environment.

Furthermore, even after each battery cell 1 reaches the fully charged state while the aircraft is flying, charging of each battery cell 1 from the battery charger (or power generator) is continued, which allows the current to flow to the heater 21 of the protection circuit 2 to thereby heat the battery cell 1. The continuous charging of the battery cell 1 enables the battery cell 1 to remain at an appropriate temperature during flight, and allows the internal resistance of the battery cell 1 to be reduced. As a result, even at the time of an emergency in a low-temperature environment, it is possible to supply electric power with a sufficient output.

In addition, the battery system S, which includes a plurality of battery cells 1 that are serially connected, includes the protection circuit 2 provided for the respective battery cells 1, and therefore the switching between charging and heating can be performed individually for the respective battery cells 1. Further, because the protection circuit 2 is provided for the respective battery cells 1, switching between charging and heating can be efficiently performed for the respective battery cells 1 in accordance with the magnitude of the internal resistance of each battery cell 1, and it is therefore possible to enhance the state of charge of each battery cell 1 in a shorter time than in a case in which switching between charging and heating of each battery cell 1 is performed en bloc.

Furthermore, in the battery system S of the present embodiment, each battery cell 1 includes the heater 21, and this allows optimal heating in accordance with each battery cell 1 even when there are variations in temperature between the battery cells 1. When heating of a plurality of battery cells 1 is performed en bloc, the life of the battery cells 1 is shortened due to excessive heating of battery cells 1 that do not need to be heated. In contrast, in the battery system S of the present embodiment, heating is performed in accordance with the respective battery cells 1, and this can prevent or reduce the shortening of the life of the battery cells 1 due to excessive heating.

The protection circuit 2 of the present embodiment is configured so that, when a temperature of the battery cell 1 is lower than the predetermined temperature in a state in which charging is not being performed for the battery cell 1, a closed circuit is formed by the battery cell 1, the portion of the upstream-side main electrical path A downstream relative to the first connection position P1 with the bypass electrical path 20, the portion of the downstream-side main electrical path B upstream relative to the second connection position P2 with the bypass electrical path 20, and the bypass electrical path 20, and hence the battery cell 1 can be heated by the heater 21 that generates heat using the electric power of the battery cell 1 itself. Thus, the battery cell 1 can demonstrate appropriate output performance at the time of the engine starting of the aircraft, and it is therefore possible to prevent a power shortage.

In particular, in the present embodiment, the protection circuit 2 further includes the short-cut electrical path 30 that links the first position P6 that is located on the portions of the bypass electrical path 20 downstream relative to the heater 21 and the second position P7 that is located at a position that is further downstream relative to the first position P6 in the bypass electrical path 20; the switch 22 disposed between the first position P6 and the second position P7 of the bypass electrical path 20, the switch 22 provided to open the bypass electrical path 20 when the voltage of the battery cell 1 falls below a predetermined voltage and close the bypass electrical path 20 when the voltage of the battery cell 1 exceeds the predetermined voltage; and the electrical path opening-closing switch 31, which is provided in the short-cut electrical path 30, to open the short-cut electrical path 30 when the temperature of the battery cell 1 is higher than a predetermined temperature, and to close the short-cut electrical path 30 when the temperature of the battery cell 1 is lower than the predetermined temperature. Hence, it is possible to reliably switch between the state in which the current flows to the battery cell 1 and the state in which the current flows to the heater 21. Even in a low-temperature environment, it is also possible to place the battery cell 1 in a state in which the battery cell 1 demonstrates appropriate output performance.

Further, the short-cut electrical path 30 is provided with the manual opening-closing switch 32 that performs switching between the opening and closing of the short-cut electrical path 30, and it is therefore possible to prevent unnecessary consumption of the electric power of the battery cell 1 (to prevent the battery from going dead).

Furthermore, the protection circuit 2 of the present embodiment also includes the heater bypass electrical path 40 that connects the portion of the bypass electrical path 20 upstream relative to the heater 21 to the portion of the bypass electrical path 20 downstream relative to the heater 21. With this, when the temperature of the battery cell 1 exceeds a predetermined temperature as a result of heating by the heater 21, the current flows to the heater bypass electrical path 40, and it is therefore possible to prevent the heater 21 from heating the battery cell 1 more than necessary.

In particular, the protection circuit of the present embodiment further includes: the resistor 41 disposed at a midway position of the heater bypass electrical path 40, and the heat radiator 50 that radiates heat of the resistor 41 of the heater bypass electrical path 40 to outside, and the electrical path changeover switch 42 disposed at the fifth connection position P to connect the bypass electrical path 20 to the heater bypass electrical path 40, the changeover switch 42 provided to connect the portion of the bypass electrical path 20 upstream relative to the fifth connection position P8 to the portion of the bypass electrical path 20 downstream relative to the fifth connection position P8 until the temperature of the battery cell 1 reaches a predetermined temperature, and to connect the portion of the bypass electrical path 20 upstream relative to the fifth connection position P8 to the heater bypass electrical path 40 when the temperature of the battery cell 1 exceeds the predetermined temperature by turning on and off the electrical path changeover switch 42. With this, it is possible to reliably switch between the state in which the battery cell 1 is heated by the heater 21 and the state in which the battery cell 1 is not heated buy the heater 21. Further, heating of the battery cell 1 by the heater 21 allows the battery cell 1 to demonstrate appropriate output performance and charging performance, as well as allows the prevention of excessive heating of the battery cell 1.

Further, the circuit breaker 60 is arranged on the upstream-side main electrical path A to open the upstream-side main electrical path A when a current that is greater than or equal to a specified current flows. Because of this, it is possible to prevent charging of the battery cell 1 and heating of the battery cell 1 by the heater 21 on the bypass electrical path 20 from being performed in an abnormal state.

It is to be noted that the present invention is not limited to the above described embodiment, and naturally various changes may be made without departing from the spirit and scope of the present invention.

While the description of the above embodiment is directed to an aircraft such as a small airplane or a helicopter, the present invention is not limited to this, and the battery system S may also be applicable in a vehicle or a watercraft that operates during the winter season or in a cold climate, or may be an apparatus or equipment that is used in a cold climate.

While the description of the above embodiment is directed to the battery system S that includes a so-called "assembled battery" in which a plurality of battery cells 1 . . . are serially arranged, the present invention is not limited to this. The battery system S may include a single battery cell 1, or a plurality of battery cells 1 that are connected in series may constitute a group of battery cells and the battery system S may include a plurality of the groups of battery cells that are connected in parallel.

Figure 3:
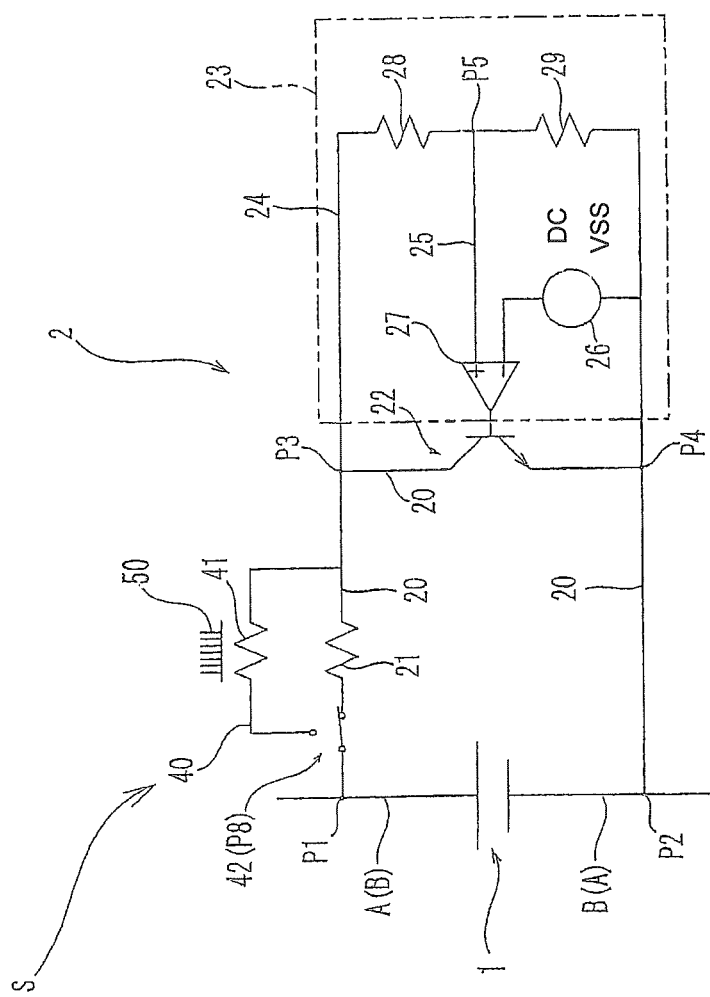
FIG. 3 is a schematic circuit diagram of a battery system according to another embodiment of the present invention.
Figure 4:
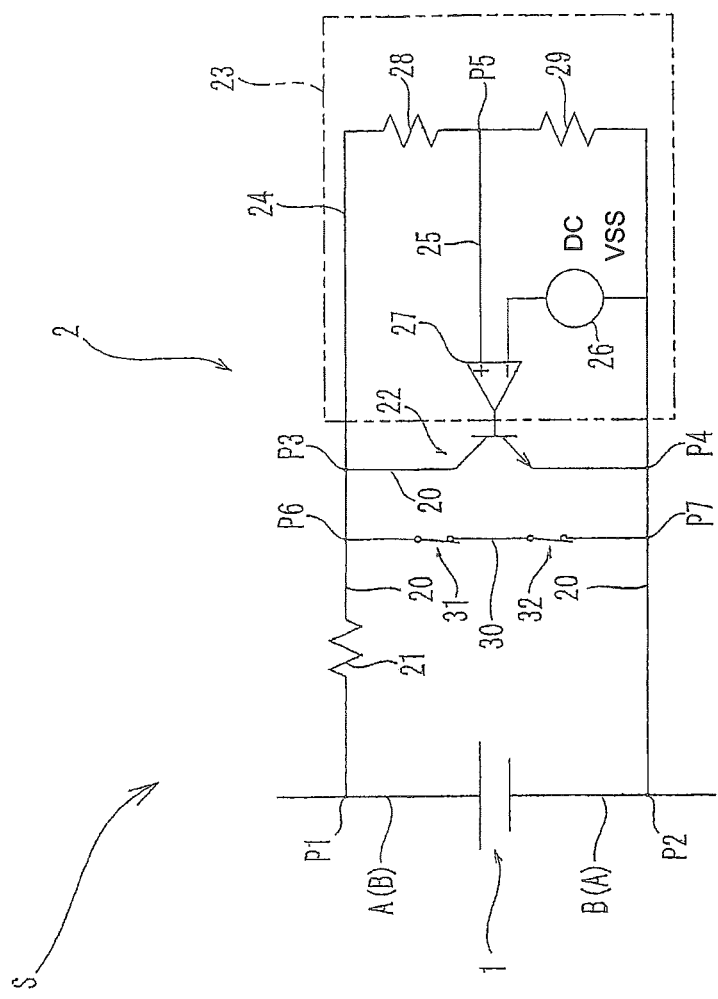
FIG. 4 is a schematic circuit diagram of a battery system according to a further embodiment of the present invention.

In the above described embodiment, the protection circuit 2 that includes the short-cut electrical path 30 and the heater bypass electrical path 40 is described. However, the present invention is not limited to this, and for example, as shown in FIG. 3, the protection circuit 2 may be provided with the bypass electrical path 20 and the heater bypass electrical path 40, or as shown in FIG. 4, may be provided with the bypass electrical path 20 and the short-cut electrical path 30.

Figure 5:
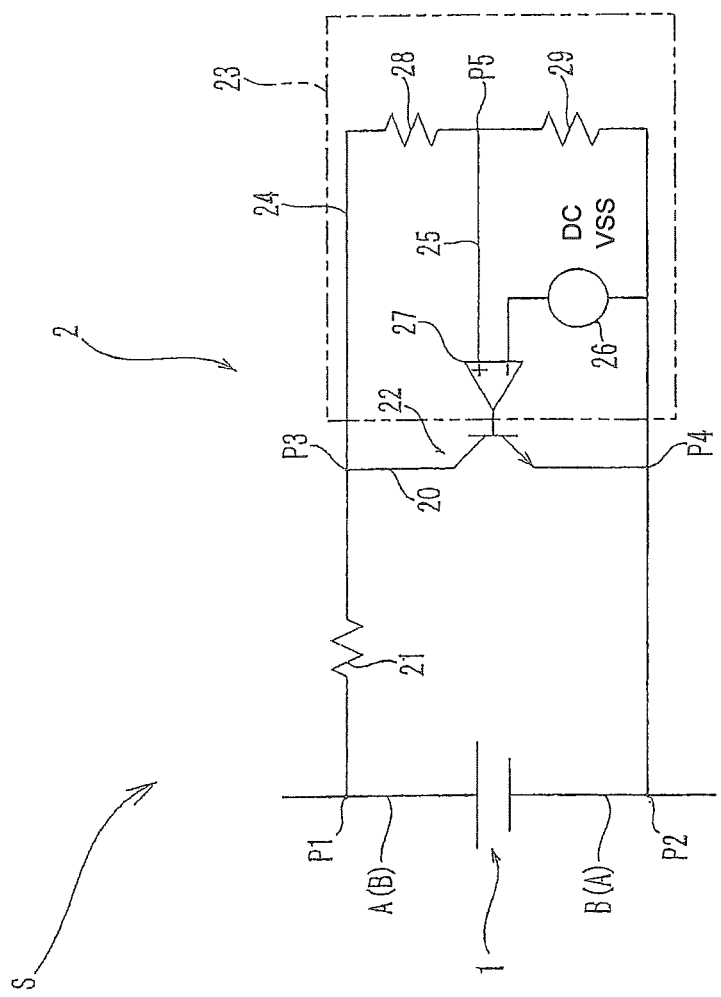
FIG. 5 is a schematic circuit diagram of a battery system (circuit of a basic form) according to a further embodiment of the present invention.

Further, as shown in FIG. 5, the protection circuit 2 may be provided only with the bypass electrical path 20 that connects the upstream-side main electrical path A to the downstream-side main electrical path B. That is, it is only necessary that the protection circuit 2 at least include the bypass electrical path 20, and the heater 21 be arranged on the bypass electrical path 20. As will be understood, however, it is preferable to adopt a configuration that is similar to the above described embodiment in order to prevent excessive heating of the battery cell 1 by the heater 21, and to ensure output performance for the starting of the apparatus or the like.

The heater 21, which is arranged on the bypass electrical path 20, is not limited to a particular type, and for example, the heater 21 may be the one that provides resistance heating (heating by means of Joule's heat), the one that provides dielectric heating, or the one that provides microwave heating. That is, various types of heaters can be employed as the heater 21 as long as it generates heat using the current that flows through the bypass electrical path 20.

Now a description is given of a configuration in which the heater 21 is arranged adjacent to or in close contact with the battery cell 1. For this configuration, a layer of a heat conducting material may be arranged between the battery cell 1 and the heater 21, or alternatively an air layer may be arranged between the battery cell 1 and the heater 21, or further alternatively the battery cell 1 and the heater 21 may be in direct contact with each other. When a layer of a heat conducting material or an air layer is arranged between the battery cell 1 and the heater 21, the thickness of the layer may preferably be not more than 5 mm in order to efficiently convey the heat of the heater 21 to the battery cell 1.

In the above described embodiment, the protection circuit 2 includes: a transistor as the switch 22 arranged on the bypass electrical path 20; and the switch driving circuit 23 that causes the transistor to close and open the bypass electrical path 20, but the present invention is not limited to this. For example, a configuration may be adopted in which the battery management unit U detects the voltage of the battery cell 1, and the switch 22 is configured to mechanically open the bypass electrical path 20 based on an instruction of the battery management unit U when the battery management unit U determines that the voltage of the battery cell 1 is lower than the predetermined voltage, and to mechanically close the bypass electrical path 20 based on an instruction of the battery management unit U when the battery management unit U determines that the voltage of the battery cell 1 is higher than the predetermined voltage.

Further, in the above described embodiment, the switch 22 (transistor) is arranged on the bypass electrical path 20 to shift the flow of current, but the present invention is not limited to this. For example, an electrical path changeover switch may be arranged at least at either one of the first connection position P1 at which the upstream-side main electrical path A and the bypass electrical path 20 are connected to each other; and the second connection position P2 at which the downstream-side main electrical path B and the bypass electrical path 20 are connected to each other. With this, it is possible to switch between a state in which current from the upstream portion of the upstream-side main electrical path A flows to the main electrical path (upstream-side main electrical path A or downstream-side main electrical path B side) and a state in which current flows from the upstream-side main electrical path A to the downstream-side main electrical path B via the bypass electrical path 20. In this case, the turning on and off of the electrical path changeover switch may be performed based on an instruction signal from the battery management unit U. It is to be noted that in this case too, the heater 21 is provided on the bypass electrical path 20, and the heater 21 is arranged within such a range that the heater 21 imparts a thermal effect to the battery cell 1.

In the above described embodiment, the circuit breaker 60 is provided only for the upstream-side main electrical path A that is connected to the most upstream one of the battery cells 1, but the present invention is not limited to this, and for example, the circuit breaker 60 may be provided in the upstream-side main electrical path A (or downstream-side main electrical path B) of each battery cell 1. With this configuration too, it is possible to open the electrical path using the circuit breaker 60 to stop the flow of the current.

In the above described embodiment, the circuit breaker 60 is employed that opens the electrical path based on an instruction signal from the battery management unit U, but the present invention is not limited to this when the circuit breaker 60 is provided for the electrical paths A and B. For example, a fuse or breaker may be adopted as the circuit breaker 60 to open the electrical paths A and B by its own function when the current value, voltage value, or temperature of the battery cell 1 are at an abnormal level, but a normally closed contactor may preferably be used.

In the above described embodiment, when the battery management unit U determines that the temperature of the battery cell 1 is lower than a predetermined temperature in a state in which charging of the battery cell 1 is not being performed (state before starting the engine), the short-cut electrical path 30 is placed in a closed (conductive) state based on an instruction signal from the battery management unit U to thereby form a closed circuit by the bypass electrical path 20, the battery cell 1, the upstream-side main electrical path A, and the downstream-side main electrical path B. However, the present invention is not limited to this, and for example, instead of providing the short-cut electrical path 30, the transistor provided as the switch 22 on the bypass electrical path 20 may be turned on and off by manual operation of the operator or through the battery management unit U. In this case, the battery management unit U may be configured to operate upon determining that the temperature of the battery cell 1 is lower than the predetermined temperature so as to prevent an erroneous operation by the operator. In the configuration in which the bypass electrical path 20, the battery cell 1, the upstream-side main electrical path A, and the downstream-side main electrical path B form a closed circuit when it is determined that the temperature of the battery cell 1 is lower than the predetermined temperature, the protection circuit 2 may include a switch which is to open the closed circuit when the temperature of the battery cell 1 exceeds the predetermined temperature, the switch being disposed on the portion of the upstream-side main electrical path A downstream relative to the first connection position P1 (connection position with the bypass electrical path 20 in the upstream-side main electrical path A), on the portion of the downstream-side main electrical path B upstream relative to the second connection position P2 (connection position with the bypass electrical path 20 in the downstream-side main electrical path B), or on the bypass electrical path 20.

In the above described embodiment, the short-cut electrical path 30 includes the electrical path opening-closing switch 31 and the manual opening-closing switch 32. Alternatively, the short-cut electrical path 30 may include only the electrical path opening-closing switch 31 as the switch in the short-cut electrical path 30 if the configuration is such that the battery management unit U receives a signal from outside that is generated by the operator, and the battery management unit U instructs the electrical path opening-closing switch 31 to turn on or off based on the received signal. Further, the protection circuit 2 may include a switch to form the closed circuit based on a signal from outside, the switch being arranged on the portion of the upstream-side main electrical path A downstream relative to the first connection position P1 (connection position with the bypass electrical path 20 in the upstream-side main electrical path A), the portion of the downstream-side main electrical path B upstream relative to the second connection position P2 (connection position with the bypass electrical path 20 in the downstream-side main electrical path B), or in the bypass electrical path 20. In this case, as will be understood, the battery management unit U is configured not to turn on the electrical path opening-closing switch 31 (switch device) when the temperature of the battery cell 1 is higher than the predetermined temperature even if the battery management unit U receives a signal from outside.

In the above described embodiment, current is fed to the bypass electrical path 20 if the voltage of the electric cell 1 exceeds a predetermined voltage and the current is fed to the battery cell 1 if the voltage of the electric cell 1 falls below the predetermined voltage. However, when the voltage of the battery cell 1 corresponds to the predetermined voltage, the current may be fed either to the bypass electrical path 20 or to the current may be fed to the battery cell 1. That is, when the voltage of the battery cell 1 corresponds to the predetermined voltage, selection of the electrical path may be arbitrarily determined.

Further, in the above described embodiment, current is fed to the heater bypass electrical path 40 when the temperature of the electric cell 1 exceeds a predetermined temperature and the current is fed to the heater 21 if the temperature of the electric cell 1 falls below the predetermined temperature. However, when the temperature of the battery cell 1 corresponds to the predetermined temperature, the current may be fed to the heater bypass electrical path 40 or to the heater 21. That is, when the temperature of the battery cell 1 corresponds to the predetermined temperature, selection of the electrical path may be arbitrarily determined.

In the above described embodiment, switching between on and off states of the electrical path opening-closing switch 31 is performed based on the instruction from the battery management unit U, but the present invention is not limited to this, and switching between on and off states of the electrical path opening-closing switch 31 may be performed by means of a thermostat.

In the above described embodiment a lithium-ion secondary battery is described as an example of the battery cell 1, but the present invention is not limited to this, and a Ni—Cd battery or other kinds of rechargeable and dischargeable secondary batteries may be employed.

DESCRIPTION OF REFERENCE CODES

S: battery system, 1: battery cell (secondary battery), 2: protection circuit, 20: bypass electrical path, 21: heater, 22: switch, 23: switch driving circuit, 24: main electrical path for driving, 25: branch electrical path, 26: direct-current voltage supply source, 27: comparator, 28: first resistor, 29: second resistor, 30: short-cut electrical path, 31: electrical path opening-closing switch, 32: manual opening-closing switch, 40: heater bypass electrical path, 41: resistor, 42: electrical path changeover switch, 50: heat radiator, 60: circuit breaker, A: upstream-side main electrical path, B: downstream-side main electrical path, P1: first connection position, P2: second connection position, P3: third connection position, P4: fourth connection position, P5: partway position (branching position), P6: first position, P7: second position, P8: fifth connection position, U: battery management unit

The invention claimed is:

1. A battery system, comprising:
a secondary battery cell that includes a positive terminal and a negative terminal;
an upstream-side main electrical path that is connected to the positive terminal of the secondary battery cell;
a downstream-side main electrical path that is connected to the negative terminal of the secondary battery cell;
a bypass electrical path that connects the upstream-side main electrical path to the downstream-side main electrical path,
wherein the battery system is configured so that, when a temperature of the secondary battery cell is lower than a predetermined temperature in a state in which charging is not being performed, a closed circuit is formed, the closed circuit including the secondary battery cell and the bypass electrical path,
wherein the bypass electrical path comprises a heater that generates heat using an electric power of the secondary battery cell, the heater being arranged in the secondary battery cell in a state in which a layer comprising a heat conducting material or air is interposed between the heater and the secondary battery cell, and
wherein a thickness of the layer is less than or equal to 5 mm;
a switch that switches between an opening and a closing of the bypass electrical path;
a short-cut electrical path that connects a portion of the bypass electrical path upstream relative to the switch to another portion of the bypass electrical path downstream relative to the switch; and
an electrical path opening-closing switch arranged on the short-cut electrical path, said electrical path opening-closing switch opening the short-cut electrical path when the temperature of the secondary battery exceeds the predetermined temperature.

2. The battery system according to claim 1,
wherein the electrical path opening-closing switch is arranged on any one of:
a portion of the upstream-side main electrical path between a connection position at which the upstream-side main electrical path and the bypass electrical path are connected to each other and the positive terminal of the secondary battery;
another portion of the downstream-side main electrical path between another connection position at which the downstream-side main electrical path and the bypass electrical path are connected to each other and the negative terminal of the secondary battery; and
the bypass electrical path, the electrical path opening-closing switch forming the closed circuit based on a signal from outside.

3. The battery system according to claim 1,
wherein the electrical path opening-closing switch is arranged on any one of:
a portion of the upstream-side main electrical path between a connection position at which the upstream-side main electrical path and the bypass electrical path are connected to each other and the positive terminal of the secondary battery;
another portion of the downstream-side main electrical path between another connection position at which the downstream-side main electrical path and the bypass electrical path are connected to each other and the negative terminal of the secondary battery.

4. The battery system according to claim 1, further comprising:
a manual opening-closing switch that manually switches between the opening and the closing of the short-cut electrical path.

5. The battery system according to claim 1, wherein the secondary battery comprises a plurality of secondary battery cells, wherein the bypass electrical path comprises a plurality of bypass electrical paths for the plurality of secondary battery cells, respectively, and wherein each of the bypass electrical paths comprises a heater that generates heat using the current flowing through the bypass electrical path, the heater being arranged adjacent to or in close contact with each of the secondary battery cells so as to impart a thermal effect to the secondary battery cells.

6. The battery system according to claim 5, further comprising:

a plurality of detectors being attached to the secondary battery cells, the detectors detecting a temperature of the secondary battery cells.

7. The battery system according to claim 1, wherein a distance between the secondary battery cell and the heater is less than or equal to 5 mm.

8. A battery system, comprising:

a secondary battery cell that includes a positive terminal and a negative terminal;

an upstream-side main electrical path that is connected to the positive terminal of the secondary battery cell;

a downstream-side main electrical path that is connected to the negative terminal of the secondary battery cell;

a bypass electrical path that connects the upstream-side main electrical path to the downstream-side main electrical path, wherein the battery system is configured so that, when a voltage of the secondary battery cell exceeds a predetermined voltage during charging, current flowing through the secondary battery cell decreases while current flowing through the bypass electrical path increases, and when the voltage of the secondary battery cell falls below the predetermined voltage during the charging, the current flowing through the secondary battery cell increases while the current flowing through the bypass electrical path decreases, wherein the bypass electrical path comprises a heater that generates heat using the current flowing through the bypass electrical path, the heater being arranged in the secondary battery cell in a state in which a layer comprising a heat conducting material or an air is interposed between the heater and the secondary battery cell, and wherein a thickness of the layer is less than or equal to 5 mm;

a switch that switches between an opening and a closing of the bypass electrical path;

a short-cut electrical path that connects a portion of the bypass electrical path upstream relative to the switch to another portion of the bypass electrical path downstream relative to the switch; and an electrical path opening-closing switch arranged on the short-cut electrical path, said electrical path opening-closing switch opening the short-cut electrical path when a temperature of the secondary battery is less than a predetermined temperature.

9. The battery system according to claim 8, wherein a resistance value of the heater satisfies Expression 1: the resistance value of the heater<set charging voltage of the secondary battery cell/maximum charging current flowing through the secondary battery cell.

10. The battery system according to claim 8, a switch that wherein the switch closes the bypass electrical path when the voltage of the secondary battery cell is higher than the predetermined voltage and opens the bypass electrical path when the voltage of the secondary battery cell is lower than the predetermined voltage and opens the bypass electrical path when the voltage of the secondary battery cell is lower than the predetermined voltage.

11. The battery system according to claim 8, wherein the secondary battery cell comprises a plurality of secondary battery cells, wherein the bypass electrical path comprises a plurality of bypass electrical paths for the plurality of secondary battery cells, respectively, and wherein each of the bypass electrical paths comprises a heater that generates heat using the current flowing through the bypass electrical path, the heater being arranged in each of the secondary battery cells in a state in which a layer comprising a heat conducting material or air is interposed between the heater and the secondary battery cell, and wherein a thickness of the layer is less than or equal to 5 mm.

12. The battery system according to claim 11, wherein the secondary battery cells and the bypass electrical paths are connected in parallel, respectively, to form parallel circuits that are connected in series.

13. The battery system according to claim 11, further comprising:

a plurality of detectors being attached to the secondary battery cells, the detectors detecting a temperature of the secondary battery cells.

14. A battery system, comprising:

a plurality of secondary battery cells each of which includes a positive terminal and a negative terminal;

an upstream-side main electrical path that is connected to the positive terminal of the secondary battery cell;

a downstream-side main electrical path that is connected to the negative terminal of the secondary battery cell;

a plurality of bypass electrical paths that connects the upstream-side main electrical path to the downstream-side main electrical path;

a plurality of detectors;

a heater bypass electrical path that connects a portion of the plurality of bypass electrical paths upstream relative to a heater to another portion of the plurality of bypass electrical paths downstream relative to the heater;

a resistor in the heater bypass electrical path;

a heat radiator that radiates a heat of the resistor to outside;

an electrical path changeover switch arranged at at least one of two connection positions at which the plurality of bypass electrical paths and the heater bypass electrical path are connected to each other; and a short-cut electrical path that connects a first portion of the plurality of bypass electrical paths downstream relative to the heater to a second portion of the plurality of bypass electrical paths downstream relative to the first portion, wherein the battery system is configured such that, when a voltage of the plurality of secondary battery cells exceeds a predetermined voltage during a charging, a current flowing through the plurality of secondary battery cells decreases while a current flowing through the plurality of bypass electrical paths increases, and when the voltage of the plurality of secondary battery cells falls below the predetermined voltage during the charging, the current flowing through the plurality of secondary battery cells increases while the current flowing through the plurality of bypass electrical paths decreases, wherein each of the plurality of bypass electrical paths comprises the heater that generates heat using the current flowing through the plurality of bypass electrical paths, the heater being arranged adjacent to or in close contact with each of the secondary battery cells so as to impart a thermal effect to the secondary battery cells, wherein the plurality of detectors are attached to the secondary battery cells and detect a temperature of the secondary battery cells, wherein the electrical path changeover switch closes the heater bypass electrical path when the temperature of the secondary battery is higher than a predetermined temperature and opens the heater bypass electrical path when the temperature of the secondary battery is lower than the predetermined temperature, and wherein the short-cut electrical path comprises an electrical path opening-closing switch closing the short-cut electrical path when the temperature of the secondary battery is higher than the predetermined temperature and opening the short-cut electrical path when the temperature of the secondary battery is lower than the predetermined temperature, and a manual opening-closing switch manually switching between open and close states of the short-cut electrical path.

* * * * *